No. 655,351. Patented Aug. 7, 1900.
W. ROCHLITZ.
WATER HEATING APPARATUS.
(Application filed Dec. 30, 1899.)
(No Model.)
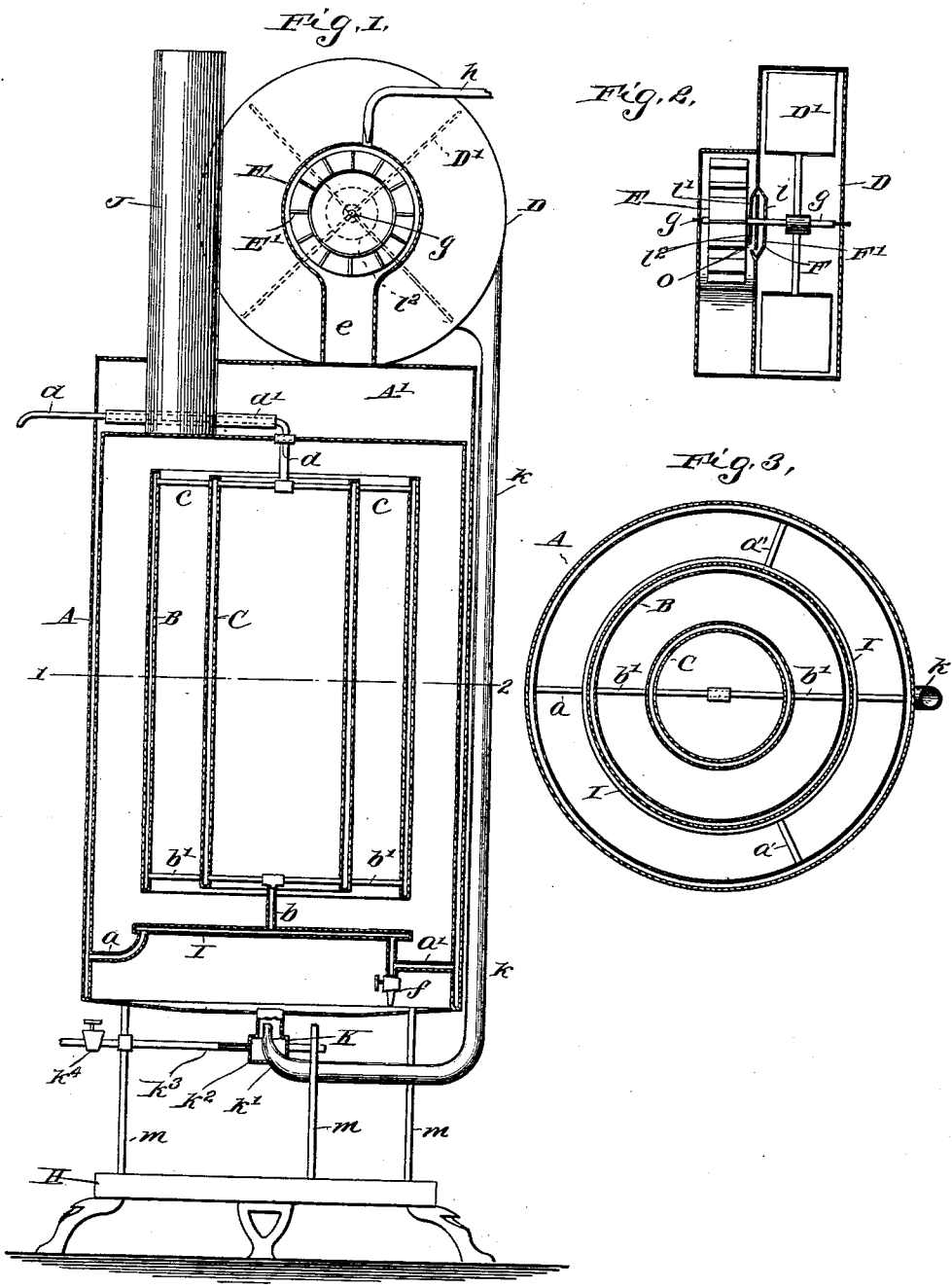

UNITED STATES PATENT OFFICE.

WILLIAM ROCHLITZ, OF CHICAGO, ILLINOIS.

WATER-HEATING APPARATUS.

SPECIFICATION forming part of Letters Patent No. 655,351, dated August 7, 1900.

Application filed December 30, 1899. Serial No. 742,086. (No model.)

*To all whom it may concern:*

Be it known that I, WILLIAM ROCHLITZ, a citizen of the United States, residing at Chicago, in the county of Cook and State of Illinois, have invented a new and useful Instantaneous Water-Heating Apparatus, of which the following is a specification.

The object of my invention is to provide a heating device which will yield a continuous supply of hot water.

Figure 1 is a vertical central sectional view of the apparatus; Fig. 2, a vertical section through the fan and turbine, and Fig. 3 a horizontal section on the line 1 2 of Fig. 3.

Similar letters refer to similar parts throughout the different views.

A, B, and C are three concentric double-walled cylinders affording three annular chambers. The outer cylinder A is provided with an extended water-receiving portion A'.

I is a disk consisting of two plates of metal soldered together circumferentially and affording a shallow chamber which communicates with A by means of the short tubes $a$ $a'$ and with B and C by means of the pipes $b$ $b'$. A drain-cock $f$ is attached to the pipe $a'$ and communicates with the outer air. The pipe $c$ connects the two cylinders B and C and communicates with the outer air by means of the pipe $d$, passing through the chamber A'. The pipe $d'$ incloses $d$ and prevents the hot water passing out through $d$ from becoming chilled by contact with the cold water in A'. Passing through but not communicating with the chamber A' is a flue-pipe J.

Mounted upon the cylinder A is a circular chamber D, containing a fan D', which rotates upon an axle $g$, to which is also attached a turbine E'. The turbine E' rotates in a chamber E, which communicates with the chamber A' by means of the passage $e$. Extending to the chamber E from above is a water-supply pipe $h$, which is contracted at its end and the size of whose opening is such that the greatest amount of water which can be sufficiently heated in transit through the heater is admitted. Extending from the chamber D down one side of the device is a pipe $k$, which is bent to the form shown and terminates in a nozzle $k'$. Around the nozzle $k'$ is a chamber $k^2$, which communicates through the pipe $k^3$ and cock $k^4$ with a hydrocarbon-gas supply. The water-heater is supported on legs $m$, connected to the base H. Instead of using this method of support the heater may be attached to a wall by means of brackets fastened to the outer wall of the cylinder A. (Not shown in the figures.) This combination of turbine and fan is substantially the same as that which I used in my water-distilling apparatus patented September 26, 1893, No. 505,641. In the present case, however, I use the fan in a vertical position, and in order to prevent the water from the turbine from entering into the fan-chamber I make recourse to a device F. The wall between the chambers D and E is indented at $l$, as shown, and a corresponding raised sheet of metal $l'$ attached, forming the chamber F', in which revolves a disk $l^2$, which is attached to the shaft $g$. At the bottom of the chamber F' is a hole $o$, opening into the chamber E, which affords an outlet for the water caught in the chamber F'.

In operation water under pressure enters at the pipe $h$, which is contracted at its end, as shown, to reduce the incoming stream of water and increase its velocity. The water plays against the blades of the turbine wheel E', causing the latter to rotate and turn the fan D'. Gas is turned into the pipe $k^3$, and filling the chamber $k^2$ it rises around the nozzle $k'$, where it is ignited. The rotating fan D' sucks air into the chamber D and discharges it through the pipe $k$ and nozzle $k'$. The water which is splashed up by the rotating turbine is thrown against the rotating disk $l^2$, which throws it back into the chamber F', whence it passes back through the hole $o$ into the chamber E. The water is thus prevented from passing down through the pipe $k$ and entering the burner. The nozzle $k'$ enters a short pipe K and supplies air to the burner. The force of the air from the nozzle creates a very hot flame at the burner and forces it upward against the bottom of the disk I, whence the hot products of combustion rise around the cylinders B and C and along the inner wall of the cylinder A, heating the water contained in these and finally passing out through the flue-pipe J. The water after striking the turbine wheel falls into the chamber A' through the passage $e$ and thence passes down between the walls of the cylinder A, becoming heated in its passage by the hot products of combustion, as before mentioned. When the water reaches the bottom of the cylinder A, it passes through the short tubes $a\ a'$ into the disk I, where it is heated by the flame from the burner. The hot water then rises through the pipe $b$ and passes through the pipe $b'$ into the chambers between the walls of the cylinders B and C, where it is further heated by the hot products of combustion. When the hot water reaches the tops of the cylinders B and C, it passes out through the pipes $c$ and $d$ into a suitable receptacle (not shown) for storing it. The pipe $d$ is covered in the chamber $a'$ by another pipe $d'$ to prevent it becoming chilled by the water in $A'$.

The device is intended for use wherever a continuous flow of water is required to be heated instantaneously.

What I claim as new, and desire to secure by Letters Patent, is—

1. A water-heater comprising an outer annular water-receiving chamber, an imperforate hollow disk within the lower portion of the heater and in communication with said outer chamber, an inner annular chamber communicating with said hollow disk and provided at its upper end with an outlet-pipe extending through the outer chamber to the exterior of the heater, substantially as described.

2. In a water-heater, the combination of an outer annular water-receiving chamber which is provided with an extended water-receiving portion and an outlet for products of combustion extending through said portion, an imperforate hollow disk within the lower portion of the heater and in communication with said outer chamber, an inner annular chamber communicating with said hollow disk and provided at its upper end with an outlet-pipe extending through the outer chamber to the exterior of the heater, substantially as described.

3. In a water-heater, the combination of an outer annular water-receiving chamber which is provided with an extended water-receiving portion and an outlet for products of combustion extending through said portion, an imperforate hollow disk within the lower portion of the heater and in communication with said outer chamber, two inner annular chambers which are in communication with the disk and are provided at their upper ends with a common outlet-pipe extending through the outer chamber to the exterior of the heater, substantially as described.

4. A water-heater comprising an outer annular water-receiving chamber, an imperforate hollow disk within the lower portion of the heater and in communication with said outer chamber, two inner annular chambers in communication with the disk and provided at their upper ends with a common outlet-pipe extending through the outer chamber to the exterior of the heater, substantially as described.

WILLIAM ROCHLITZ.

In presence of—
OTIS N. TERRY,
THEO. F. DECKER.